United States Patent [19]

Tsuchiya et al.

[11] 4,392,664
[45] Jul. 12, 1983

[54] FRONT FORK OF MOTORCYCLE

[75] Inventors: Takayoshi Tsuchiya; Masami Matsuo, both of Iwata, Japan

[73] Assignee: Showa Manufacturing Co., Ltd., Tokyo, Japan

[21] Appl. No.: 239,398

[22] Filed: Mar. 2, 1981

[30] Foreign Application Priority Data

Nov. 4, 1980 [JP] Japan ................................. 55-153810

[51] Int. Cl.$^3$ ............................................. B62K 25/08
[52] U.S. Cl. ..................................... 280/276; 280/703
[58] Field of Search .......... 280/276, 277, 702, 703 X; 188/272; 180/219

[56] References Cited

U.S. PATENT DOCUMENTS 3,912,054 10/1975 Fabre et al. .......................... 280/276
3,989,261 11/1976 Kawaguchi .......................... 280/276
4,145,067 3/1979 Ceriani ................................. 280/276
4,295,658 10/1981 Kashima ............................... 280/276

Primary Examiner—Joseph F. Peters, Jr.
Assistant Examiner—Donn McGiehan
Attorney, Agent, or Firm—A. W. Breiner

[57] ABSTRACT

A front fork assembly for use on a motorcycle, including a fork pipe, a bottom casing slidably fitting the lower portion of the fork pipe and including means for connection to the axle of a front motorcycle wheel. The bottom casing, filled with oil, has a pipe seat anchored at the bottom portion of the bottom casing with its upper end slidably fitted to the fork pipe. An oil passage is provided for communication between the inside and outside of the pipe seat. A plunger which is equipped with a valve for opening and closing the oil passage is disposed to face a valve seat slidably fitted in the oil passage and supported by a spring adapted to slide in coaction with a braking mechanism. The front fork assembly will partly prevent nose-diving upon a braking operation of a motorcycle which includes the front fork assembly, and further will partly absorb the shocks from the road upon the braking operation of a motorcycle which includes the front fork assembly.

8 Claims, 3 Drawing Figures

FIG. 1
FIG. 2
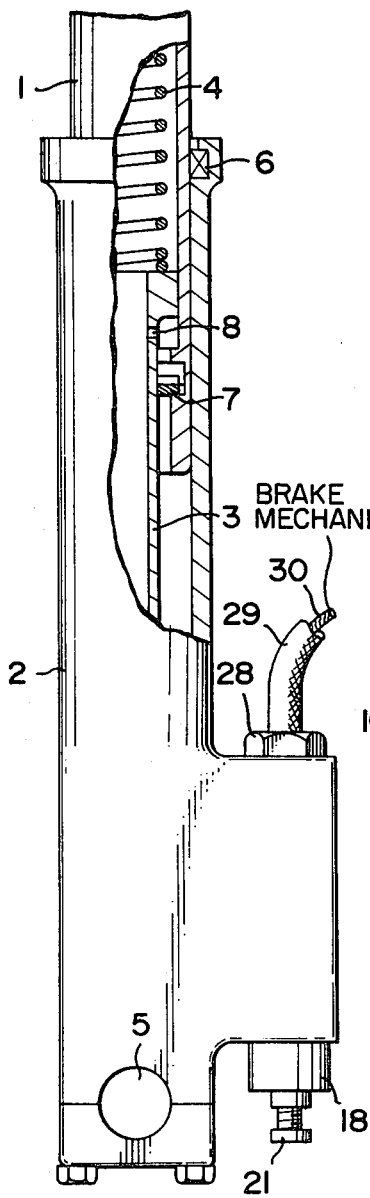
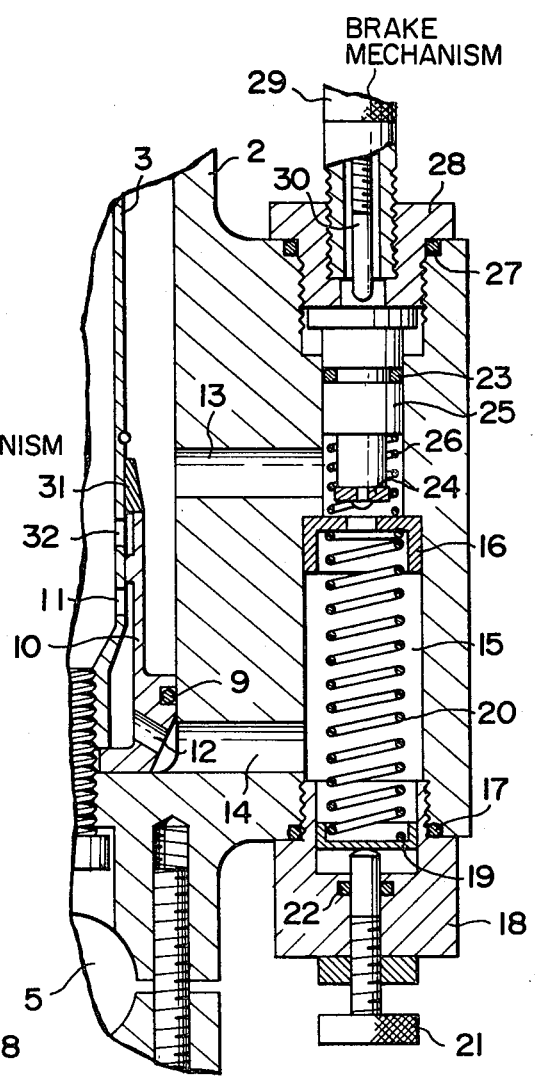

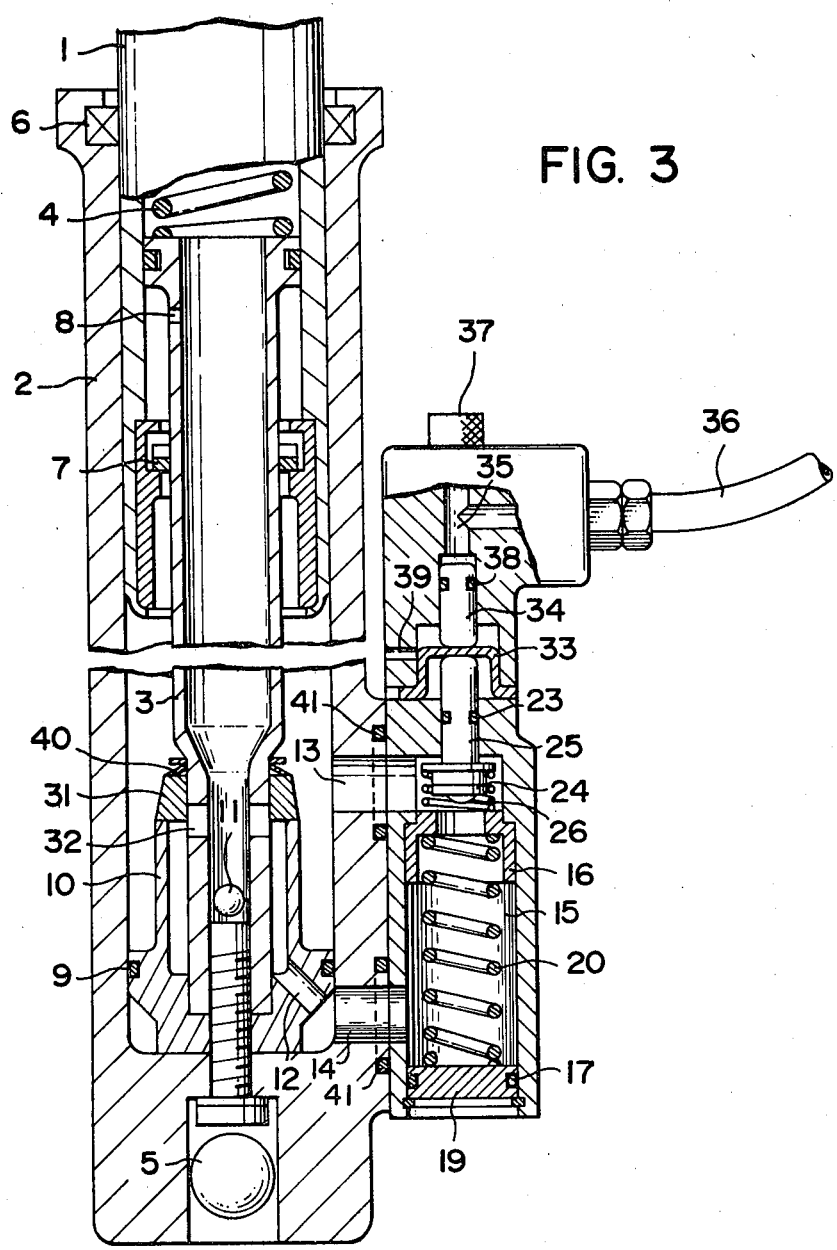

FRONT FORK OF MOTORCYCLE

BACKGROUND OF THE INVENTION

1. Field of the Invention

The present invention relates to the front fork of a motorcycle.

2. Description of the Prior Art

If a braking force is applied while a motorcycle is moving, the weight of a rider is applied to the handlebars so that a remarkably high load is applied by inertia to the handlebars. As a result, the front fork is compressed to its limit, causing difficulty in the handling of the motorcycle. If a shock due to the roughness of a road is applied during the braking, no shock-absorbing action is obtained so that not only the riding comfortability is degraded, but also the stability of the motorcycle is reduced, leading to a danger of accident.

In order to avoid the aforesaid danger, there has been proposed the so-called "anti-nose-diving mechanism." The mechanism thus proposed can prevent the front fork from being compressed by the braking operation but fails to provide the shock absorbing action in case the motorcycle comes to a roughness in the road while the braking force is being applied.

SUMMARY OF THE INVENTION

It is, therefore, an object of the present invention to provide a front fork for a motorcycle, which will prevent the nose-diving of the handlebars during a braking operation and which will provide a suitable shock-absorbing action in case a shock is applied to the body of the motorcycle while braking. The new design is of a remarkably simple construction.

According to a feature of the present invention, a seat pipe is anchored at the bottom of a bottom casing, which slidably fits onto the lower portion of a fork pipe which, in turn, is attached to the handlebars. Moreover, the bottom casing which is connected to the axle of a front wheel is filled with oil and includes an oil passage for providing communication between the inside and outside of the seat pipe.

The front fork is constructed such that there is provided a valve seat which is slidably fitted in the oil passage and is supported by spring means in order that a valve for opening and closing the oil passage is disposed to face the valve seat and is made coactive with a braking mechanism.

BRIEF DESCRIPTION OF THE DRAWINGS

FIG. 1 is a partially broken-away side elevation showing one embodiment of the front fork of a motorcycle according to the present invention;

FIG. 2 is an enlarged longitudinal section showing a portion of the embodiment of FIG. 1; and FIG. 3 is a partially broken-away side elevation showing another embodiment of the present invention.

DESCRIPTION OF THE PREFERRED EMBODIMENTS

FIG. 1 is a side elevation showing in a partial longitudinal section one embodiment of the present invention. A fork pipe 1, which has its upper end attached to the handlebar of a motorcycle, has its lower portion slidably fitted in a bottom casing 2. The bottom casing is filled with oil. A seat pipe 3, which is anchored at the bottom of the bottom casing 2, has its upper end slidably fitted in the fork pipe 1; and a body suspension spring 4 is interposed under compression between the upper end of the seat pipe 3 and the upper end of the fork pipe 1. The bottom casing 2 is formed at its lower end with a mounting hole 5, in which the axle of a front wheel is fitted, and has its upper end equipped with an oil seal 6. On the other hand, the fork pipe 1 is equipped with a check valve 7 at its lower end, and the seat pipe 3 is formed with an orifice 8 at its upper portion.

FIG. 2 is an enlarged longitudinal section showing a portion of the embodiment shown in FIG. 1. A cylindrical oil lock piece 10, in which an O-ring 9 is fitted, is attached to the lower portion of seat pipe 3; and the lower portion of said seat pipe and the piece 10 are formed with oil ports 11 and 12, respectively. Moreover, the bottom casing 2 is formed with an oil passage which is composed of oil ports 13, 14, and 15 and in which a valve seat 16 is slidably fitted.

A spring seat 19 is slidably fitted in a cylindrical bottom member 18 which, in turn, is screwed into the bottom casing 2 and sealed with an O-ring 17. A coil spring 20 is interposed under compression between spring seats 19 and 16. Spring seat 19 is held in abutment engagement with screw 21 which is screwed into bottom member 18 and sealed with O-ring 22.

Plunger 25 is slidably fitted in oil passage 15. An O-ring 23 is fitted on plunger 25 and a valve 24 made of a sealing material such as rubber is attached to the leading end of the plunger. A spring 26 is interposed under compression between plunger 25 and valve seat 16. In cylindrical screw 28, which in turn is screwed into the bottom casing and sealed with an O-ring 27, there is screwed a flexible tube 29 which is connected to the braking mechanism of the motorcycle such that its core cable 30 is disposed to face the upper end of plunger 25.

On the upper end of the oil lock piece 10 there is mounted an annular check valve 31 which is slidably fitted in the seat pipe 3. This seat pipe 3 is formed with an oil port 32 which is located below check valve 31.

In the front fork according to the embodiment thus far described, since the leading end of the core cable 30 is slightly spaced under its normal condition from plunger 25, this plunger 25 is urged by the spring 26 into contact with the screw 28; and the valve seat 16 is urged by the stronger spring 20 into abutment contact with the stepped portion of the oil port 15. Since under that condition the valve 24 being made of a sealing material is spaced from the valve seat 16, the outside of the seat pipe 3 is allowed to communicate with the inside of the same by way of an oil passage which is composed of the oil ports 13, 15, 14, 12, and 11. If the fork pipe is moved downward in response to the roughness of the road, the check valve 7 is raised so that the oil below the fork pipe flows partly into the fork pipe through a groove which is formed in the upper surface of valve 7 and partly into the pipe 1 through the oil passage and the inside of the seat pipe 3. The fork pipe can be easily moved downward by the action of a relatively weak damping force.

When fork pipe 1 is lifted by the force of the spring 4, the check valve 7 is closed, as shown in FIG. 1. As a result, the oil between the lower portion of the fork pipe 1 and the seat pipe 3 flows through the orifice 8 into the inside of the seat pipe thereby to establish a strong damping force. At the same time, the valve 31 is lifted so that the oil is supplied to below the fork pipe 1 through the oil port 32.

On the other hand, if the brake is applied while the motorcycle is running under the condition shown in FIG. 2, the core cable 30 of the flexible tube 29 which is connected to the braking mechanism is moved downwardly of FIG. 2 to push the plunger 25 so that the valve 24 is forced into contact with the valve seat 16 thereby to shut off the oil port 15. If the fork pipe 1 is moved down by the load which is exerted upon the handlebars by the inertia of the rider, the oil below the fork pipe flows only through the groove in the upper surface of the check valve 7 to the region thereabove, and the oil corresponding to the displacement thereof by the fork pipe having entered thereinto flows into the inside of the seat pipe 3 through the orifice 8. As a result, a strong damping force is established to block the downward movement of the fork pipe so that the handlebars can be prevented from diving, thereby allowing stable handling of the motorcycle.

If under that particular condition shocks are applied to the body of the motorcycle from the roughness of the road so that an additional load is applied to the fork pipe 1, the oil pressure therebelow is rapidly boosted to move down valve seat 16 against the elastic force of the spring 20. More specifically, since the valve seat 16 is moved down apart from the sealing member 24, the oil port 15 is opened so that the oil chamber outside of the seat pipe 3 restores communication with the inside of the same by way of the oil passage which is composed of the oil ports 13, 15, 14, 12, and 11. As a result, the fork pipe 1 can be easily moved down, and the oil port 32 is opened in the rising stroke to supply the oil to the region below the pipe 1. Thus, shocks due to the roughness of the road can be effectively damped. Moreover, since the elastic force of the spring 20 can be adjusted by means of the screw 21, the extent of the shocks from the road in that case can be suitably preset.

Another embodiment of the present invention will now be described in detail with reference to FIG. 3 in which parts similar to those in the foregoing embodiment are indicated by like reference numerals. The second embodiment is different from the first embodiment in the mechanism for establishing coaction between the braking mechanism and the valve.

More specifically, a second plunger 34 has its lower end facing, through a flexible diaphragm 33, the upper end of the plunger 25 equipped with valve 24 at its lower end, and has its upper end arranged in an oil chamber 35. This oil chamber 35 is connected with an oil hose 36, which in turn is connected with the hydraulic braking mechanism of the motorcycle, formed with an air venting plug 37. Moreover, an O-ring 38 for preventing the oil from leaking out of the braking mechanism is fitted on the second plunger 34. Flexible diaphragm 33 is vented to the atmosphere through an air vent 39.

Since the embodiment of FIG. 3 is similar to the embodiment of FIGS. 1 and 2 in the contracting and extending operations of the front fork in case the motorcycle is running under its normal condition, i.e., is not being braked, the following description is limited to the case in which an impact comes from the road when in the braking operation and under the braked condition.

In case the brake is applied during the running operation, the oil pressure in the braking mechanism is raised and transmitted through the oil hose 36 to the oil chamber 35. As a result, plunger 34 is moved downwardly so that the spring 26 is compressed to bring the valve 24 into contact with the valve seat 16, whereby oil passage 15 is shut off. Similarly to the embodiment of FIGS. 1 and 2, therefore, if the fork pipe 1 is moved downward by the load which is applied to the handlebars by the inertia of the rider, the oil below the fork pipe flows through the groove in the upper surface of the check valve 7 into the region thereabove. The oil corresponding to the oil displaced by the fork pipe flows from the orifice into the seat pipe 3. More specifically, a very strong damping force is established. As a result, the front fork is prevented from contracting, thereby preventing the handlebars from diving so that stable handling of the motorcycle can be maintained.

In case an impact comes from the road at the time of the braking action, an additional load is applied to the fork pipe 1 so that the oil pressure therebelow is sharply raised. As a result, the valve seat 16 is moved down against the elastic force of the spring 20 thereby establishing a clearance between the valve 24 and said valve seat. More specifically, since the oil passage 15 is opened, the oil outside of the seat pipe 3 flows through oil passage 15 and oil ports 11 and 32 into the inside of the same so that the front fork can be relatively easily contracted to absorb the aforementioned impact. In the rising stroke, on the contrary, the valve 31 is opened so that the oil can be easily supplied to the lower portion of the fork pipe 1. As a result, an effective shock-absorbing action can be obtained against the impact due to the roughness of the road.

It is to be noted that it is a mere change of design whereby the valve 31 is held by a dished disc spring 40, as shown in FIG. 3, and that the space between the seat pipe 3 and the oil lock piece 10 is divided by means of the partition, as shown in FIGS. 1 and 2. These design changes raise no difference in their effects.

In the embodiment shown in FIG. 3, it is to be understood that there can be additionally provided bottom member 18 in which the screw 21 is screwed so that the elasticity of the spring 20 may be adjusted. Further, the front fork and the anti-nose-diving mechanism may either be integrated as in the embodiment shown in FIGS. 1 and 2, or may be assembled by interposing O-rings 41 in between after they have been prepared separately.

As has been described hereinbefore, the front fork according to the present invention can partly prevent the handlebars from diving in case the braking force is applied and partly maintain the shock absorbing action against the impact coming from the roughness of the road. Thus, the riding comfortability of the rider on the motorcycle is maintained as is stable handling maintained. The construction is simple, permitting the device to be easily produced.

What is claimed is:

1. A front fork assembly for use on a motorcycle, comprising: a fork pipe; a bottom casing slidably fitting the lower portion of said fork pipe and having means for connection to the axle of the front motorcycle wheel, said bottom casing having its inside filled with oil; a seat pipe anchored at the bottom portion of said bottom casing and having its upper end slidably fitted in said fork pipe; a valve seat slidably fitted in an oil passage for providing communication between the inside and outside of said seat pipe and supported by a spring; a plunger having a valve disposed to face said valve seat for opening and closing said oil passage; and coaction means for effecting coaction between said plunger and a braking mechanism.

2. A front fork assembly according to claim 1, further comprising adjusting means for adjusting the strength of said spring.

3. A front fork assembly according to claim 1 or 2, wherein said coaction means includes a core cable extending in a flexible tube connected to said braking mechanism for pushing down said plunger.

4. A front fork assembly according to claim 1 or 2, wherein said coaction means includes an oil hose having communication with the hydraulic unit of the braking mechanism for pushing down said plunger, an oil chamber connected with said oil hose, and a second plunger contacting end-to-end with the first-named plunger.

5. A fork assembly according to claim 4, further comprising a flexible diaphragm sandwiched between the two plungers.

6. A front fork assembly according to claim 1 or 2, further comprising a spring interposed between said valve seat and said valve.

7. A front fork assembly according to claim 2, wherein said adjusting means includes a bottom member screwed in said bottom casing, a spring seat receiving one end of said spring, and a screw screwed in said bottom member and having its one end supporting said spring seat.

8. A front fork assembly according to claim 1 or 2, further comprising: an oil lock piece mounted on the outer circumference of the lower portion of said seat pipe; and an annular check valve slidably fitted on said seat pipe and mounted on the upper end of said oil lock piece.

* * * * *